G. W. VAN DEREN.
COASTER BRAKE.
APPLICATION FILED MAY 5, 1915.
1,158,337.
Patented Oct. 26, 1915.
2 SHEETS—SHEET 1.
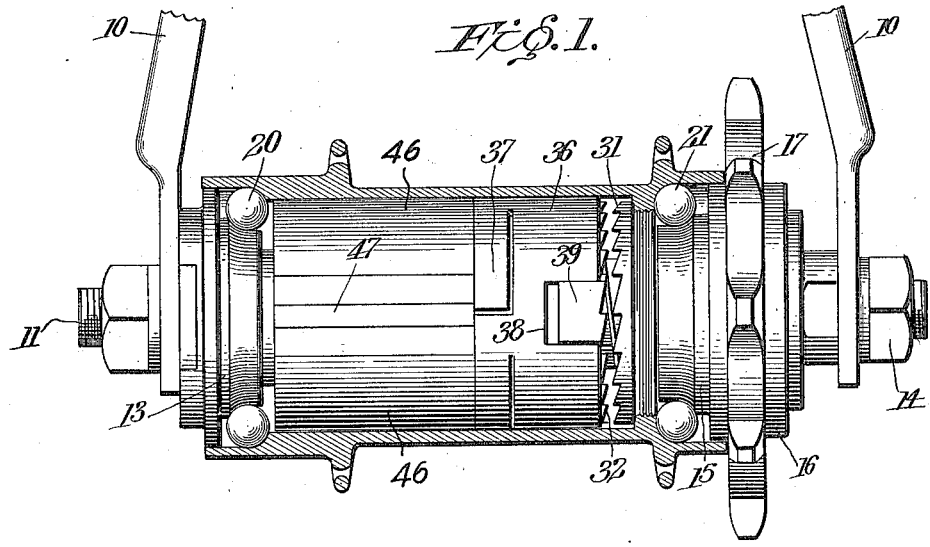
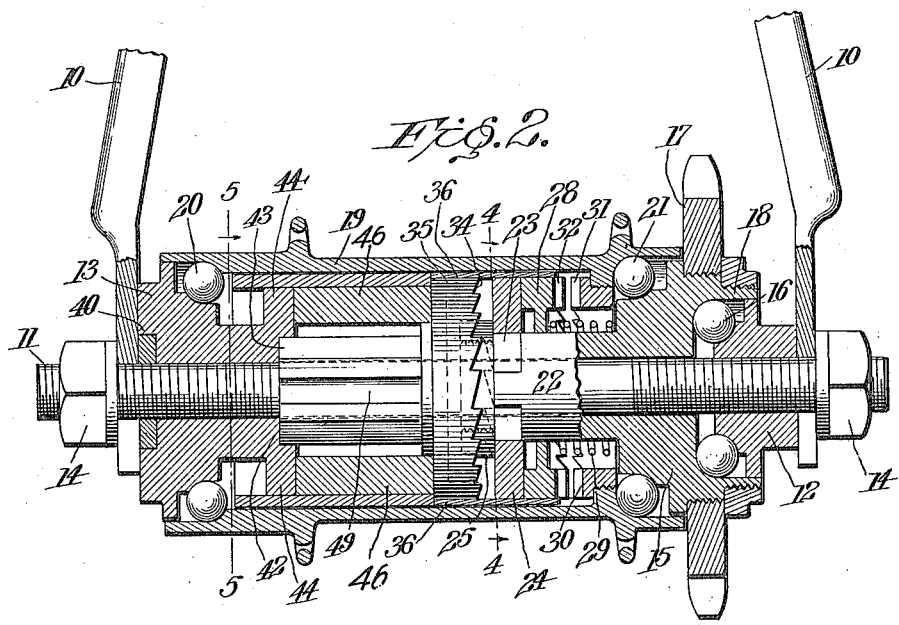
Witnesses
G. F. Baker.
H. P. Jennings
Inventor
George W. Van Deren
by Foster Freeman Watson Hart
Attorneys G. W. VAN DEREN.
COASTER BRAKE.
APPLICATION FILED MAY 5, 1915.
1,158,337.
Patented Oct. 26, 1915.
2 SHEETS—SHEET 2.
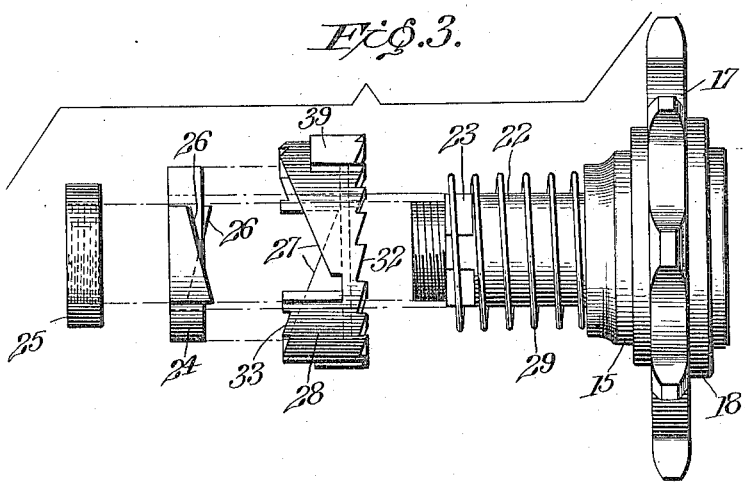
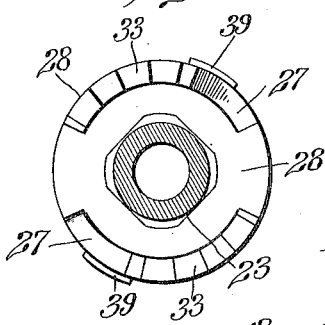
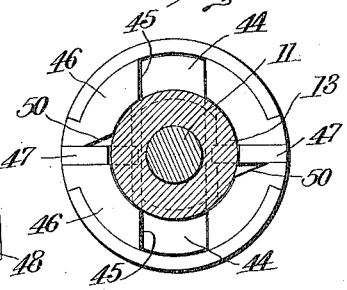
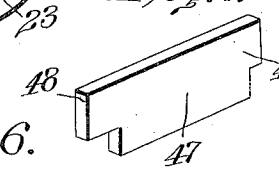
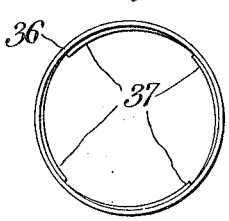
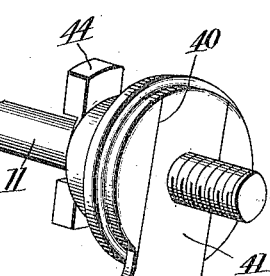
Witnesses
G. S. Baker.
H. P. Jennings.
Inventor
George W. Van Deren
by Foster Freeman Watson & Coit
Attorneys

UNITED STATES PATENT OFFICE.

GEORGE W. VAN DEREN, OF ELMIRA, NEW YORK.

COASTER-BRAKE.

1,158,337.　　　　Specification of Letters Patent.　　Patented Oct. 26, 1915.

Application filed May 5, 1915.　Serial No. 25,993.

*To all whom it may concern:*

Be it known that I, GEORGE W. VAN DEREN, a citizen of the United States, and resident of Elmira, county of Chemung, State of New York, have invented certain new and useful Improvements in Coaster-Brakes, of which the following is a specification.

This invention relates to coaster brakes for bicycles and has for its objects the provision of certain improvements which will make the brake more durable and reliable in operation.

Other objects and features of novelty will be apparent from the following description taken in connection with the accompanying drawings, in which, Figure 1 is a longitudinal section through a wheel hub, the parts of the brake being shown in elevation; Fig. 2 is a view similar to Fig. 1 with the parts of the brake also shown in section; Fig. 3 is an elevation of a group of details of the brake; Fig. 4 is a section on the line 4—4 of Fig. 2; Fig. 5 is a section on the line 5—5 of Fig. 2; Fig. 6 is an end elevation of the retarding ring; Fig. 7 is a perspective view of one of the spreaders for the brake members; and Fig. 8 is a perspective view of the brake holding parts.

Referring to the drawings, 10 indicates a portion of the bicycle frame in which is arranged the stationary axle 11. The ends of the axle 11 are threaded to receive the ball bearing cone 12, the combined cone and brake holding member 13 and the clamping nuts 14 by means of which the parts 10 of the frame are clamped against the cones 12 and 13. A driver 15 is supported on the cone 12 by means of the ball bearing 16 and carries a sprocket 17 which is secured thereon in any suitable manner, as by means of the nut 18. A wheel hub 19 is rotatably mounted on the cone 13 and the driver 15 by means of the ball bearings 20 and 21 respectively.

The driver 15 has an extension 22 which is squared, as indicated at 23, to receive a cam disk 24, the latter being secured in position by means of the nut 25. The disk 24 has oppositely arranged inclined surfaces 26 which coöperate with corresponding surfaces 27 on the cam ring 28, this ring being rotatable and axially movable on the extension 22. A spring 29 surrounds the extension 22 and coacts with the driver 15 and the ring 28 to hold the surfaces 26 and 27 in engagement.

A ring 30 has a screw threaded connection with the hub 19 so as to be rigid therewith and is provided with the clutch teeth 31 which are adapted to be engaged by corresponding teeth 32 on the ring 28. The ring 28 is also provided with teeth 33 on the opposite side thereof from the teeth 32 and these teeth are adapted to engage with the teeth 34 on the rotatable brake actuating member 35, which is mounted on the axle 11. A retarding ring 36 surrounds the member 35 and is provided with inwardly sprung tongues 37 which frictionally engage the periphery of the member 35. The ring 36 is provided also with oppositely arranged slots or key-ways 38 which engage with keys 39 on the periphery of the ring 28, as clearly shown in Fig. 1.

The member 13 has a transverse slot 40 in the outer end thereof which receives the end of an anchor arm 41, as shown in Fig. 8. The arm 41 is secured to the frame of the bicycle in the usual manner. The member 13 has a recess 42 for the end 43 of the member 35, and also has radially projecting arms 44 which are arranged in recesses 45 in the semi-cylindrical brake members 46. The brake members 46 are adapted to engage the inner surface of the hub 19, and have their meeting edges spaced a slight distance apart to receive the spreaders 47. These spreaders have end lugs 48 and engage oppositely arranged grooves 49 in the member 35. From Fig. 5 it will be noted that each of the brake members 46 has one of its edges beveled, as shown at 50, so as to facilitate the operation of the spreaders 47.

In the operation of the mechanism, with the parts in the position shown in Figs. 1 and 2, the hub 19 is free to rotate in either direction, not being connected with the driver 15 or retarded by the brake members. This is the position of the parts for coasting, the driver 15 then being stationary. If the driver is given the usual forward rotation, the coöperating surfaces 26 and 27 will cause the ring 28 to be moved toward the right and effect the engagement of the teeth 31 and 32 and thus form a positive driving connection between the driver 15 and the hub 19. If the rotation of the driver stops or is reduced, with relation to that of the hub, the ring 28 will be carried ahead and thus rotate relatively to the disk 24 until the spring 29 has moved the ring a sufficient distance axially to disengage the teeth 31 and 32. The backward rotation of the driver 15 will permit the spring 29 to move the ring 28 so as to effect the engagement of the teeth 33 and 34, thus forming a positive driving connection between the driver and the member 35 and permitting the spreaders 47 to be actuated to separate the brake members 46 and thus retard the hub 19. A forward rotation of the driver will permit the brake members to be released from the hub. The retarder 36 holds the ring 28 against rotation at all times except when the teeth 31 and 32 are in engagement and then, of course, the ring will be rotated with the hub. The retarder 36, however, permits free axial movement of the ring 28 on account of the arrangement of the keys 39 in the keyways 38.

Having described the invention what I claim and desire to secure by Letters-Patent is, 1. In a coaster brake, the combination of an axle, a brake held against rotation about the axle, a driver, a cam disk secured on said driver, a cam ring coöperating with said disk and arranged to rotate and move axially on said driver, said ring having clutch teeth on opposite sides thereof, a hub having interior clutch teeth arranged to coöperate with the teeth on one side of said ring, a rotatable actuating member for said brake arranged to coöperate with the teeth on the opposite side of said ring, and a frictional retarder coacting with said ring and said actuating member.

2. In a coaster brake, the combination of an axle, a brake held against rotation about the axle, a driver, a cam disk secured on said driver, a cam ring coöperating with said disk and arranged to rotate and move axially on said driver, said ring having clutch teeth on opposite sides thereof, a hub having interior clutch teeth arranged to coöperate with the teeth on one side of said ring, a rotatable actuating member for said brake arranged to coöperate with the teeth on the opposite side of said ring, a spring coacting with said driver and said ring and coöperating with said cam disk to move the ring axially on the driver in either direction, and a frictional retarder coacting with said ring and said actuating member.

In testimony whereof I affix my signature.

GEORGE W. VAN DEREN.